US012630046B2

(12) United States Patent
Lee

(10) Patent No.: US 12,630,046 B2
(45) Date of Patent: May 19, 2026

(54) METHOD FOR REPLACING BATTERY PACK OF HYBRID ELECTRIC VEHICLE

(71) Applicant: Heung Woo Lee, Seoul (KR)

(72) Inventor: Heung Woo Lee, Seoul (KR)

( * ) Notice: Subject to any disclaimer, the term of this patent is extended or adjusted under 35 U.S.C. 154(b) by 379 days.

(21) Appl. No.: 18/281,327

(22) PCT Filed: Apr. 11, 2022

(86) PCT No.: PCT/KR2022/005169
§ 371 (c)(1),
(2) Date: Sep. 11, 2023

(87) PCT Pub. No.: WO2022/220507
PCT Pub. Date: Oct. 20, 2022

(65) Prior Publication Data
US 2024/0157840 A1 May 16, 2024

(30) Foreign Application Priority Data

Apr. 12, 2021 (KR) ........................ 10-2021-0046997

(51) Int. Cl.
*B60L 53/80* (2019.01)
*B60R 16/02* (2006.01)
*B60R 16/04* (2006.01)

(52) U.S. Cl.
CPC .......... *B60L 53/80* (2019.02); *B60R 16/0207* (2013.01); *B60R 16/04* (2013.01); *B60Y 2200/92* (2013.01); *B60Y 2400/3086* (2013.01)

(58) Field of Classification Search
CPC .......... B60L 53/80; B60L 53/16; B60L 53/18; B60L 53/31; B60L 58/21; B60L 50/64; B60R 16/0207; B60R 16/04; B60Y 2200/92; B60Y 2400/3086; B60Y 2200/91; B60Y 2400/302; Y02E 60/10; Y02T 10/70; Y02T 10/7072; Y02T 90/12; Y02T 90/14; Y02T 10/62; H01M 10/4207; H01M 10/425; H01M 10/482; H01M 50/296; H01M 50/298; H01M 50/502; H01M 2220/20; Y04S 10/126
(Continued)

(56) References Cited

U.S. PATENT DOCUMENTS

| | | | |
|---|---|---|---|
| 2010/0121511 A1 | 5/2010 | Onnerud et al. | |
| 2014/0117754 A1* | 5/2014 | Kreutzer ............. | H01M 10/425 |
| | | | 429/61 |
| 2015/0037649 A1* | 2/2015 | Wyatt ................. | H01M 50/224 |
| | | | 429/152 |

FOREIGN PATENT DOCUMENTS

| | | |
|---|---|---|
| JP | 2009-083566 | 4/2009 |
| JP | 2013-239280 | 11/2013 |

(Continued)

*Primary Examiner* — Julian D Huffman
*Assistant Examiner* — Aiman Bickiya
(74) *Attorney, Agent, or Firm* — LEX IP MEISTER, PLLC

(57) ABSTRACT

The present invention relates to a method for replacing a battery pack of a hybrid electric vehicle, characterized in that a nickel-metal hydride battery pack in which 28 cell modules with a nominal voltage of 7.2V are arranged in series and in which pack terminals N1 to N15 for voltage sensors are installed alternately in order in the cell modules, is replaced with a lithium-ion battery pack in which a plurality of cell modules with a nominal voltage of 28.8V are arranged in series and in which module terminals R1 to R12 for voltage sensors are respectively installed in the cell modules.

4 Claims, 4 Drawing Sheets

(58) Field of Classification Search
USPC .......................................................... 320/121
See application file for complete search history.

(56)                     References Cited

FOREIGN PATENT DOCUMENTS

| | | |
|---|---|---|
| KR | 10-2004-0005066 | 1/2004 |
| KR | 10-2013-0075378 | 7/2013 |

* cited by examiner

[Fig. 1]
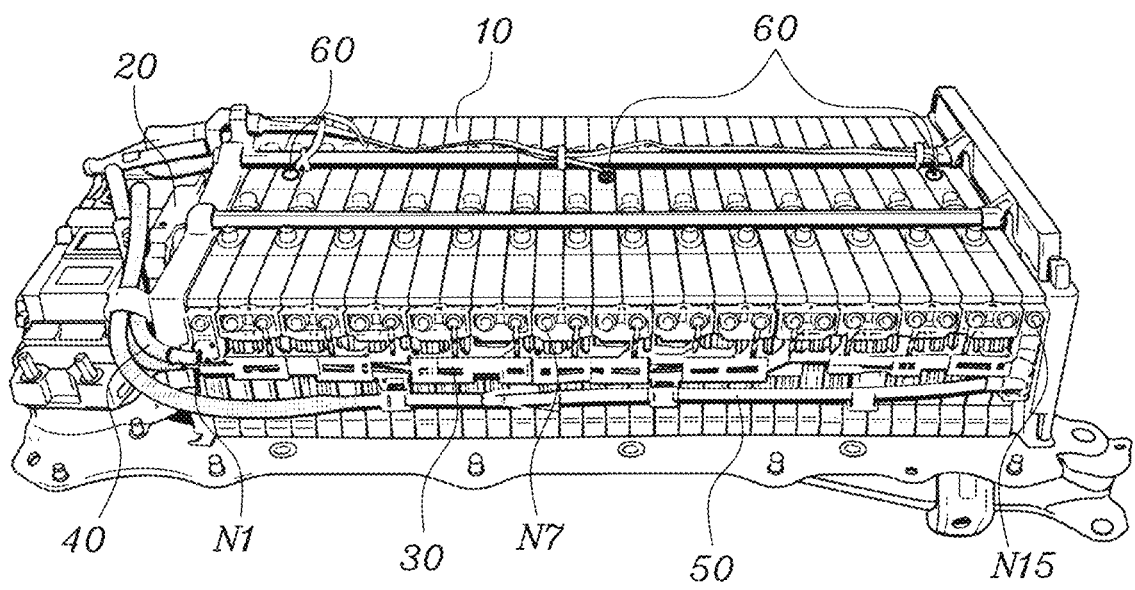
[Fig. 2]
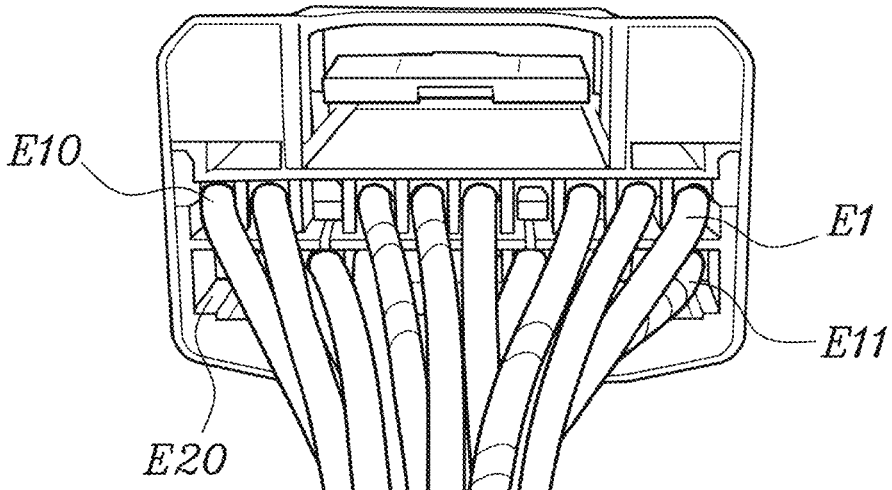

[Fig. 3]
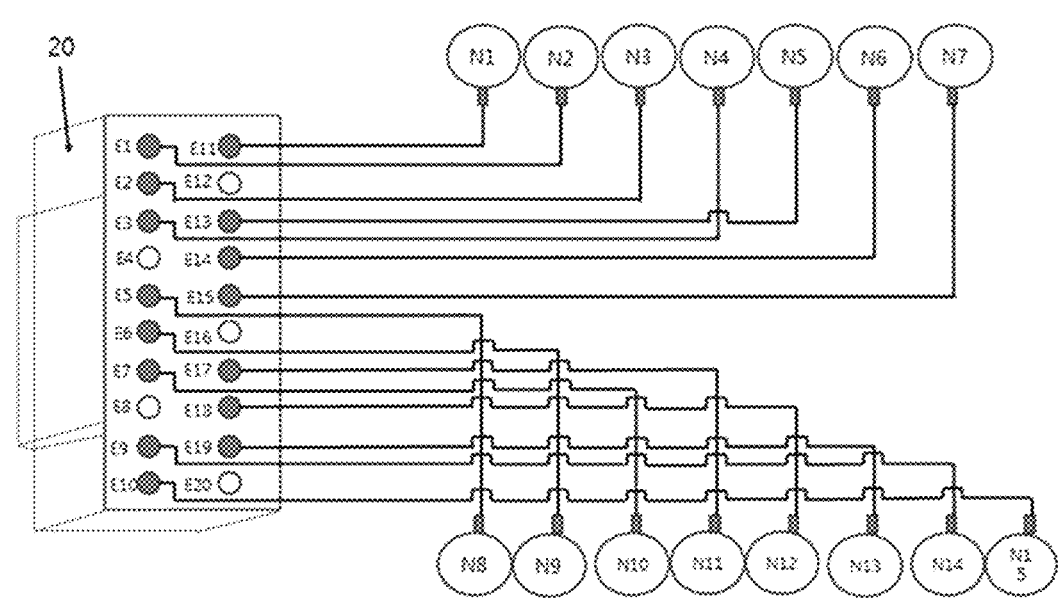
[Fig. 4]
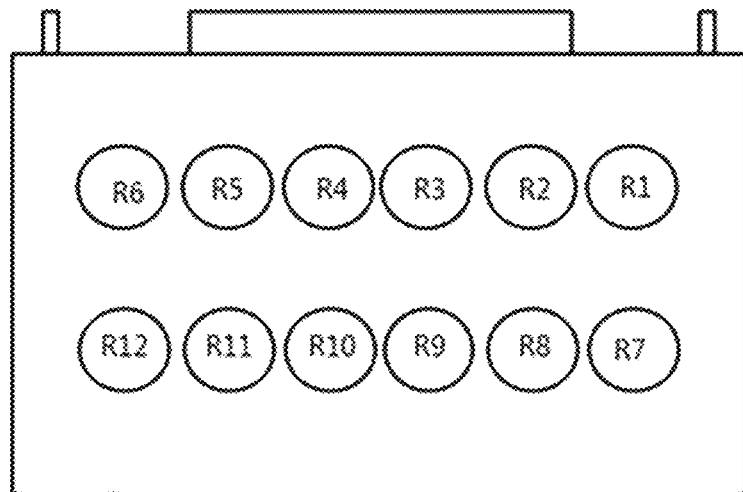

[Fig. 5]
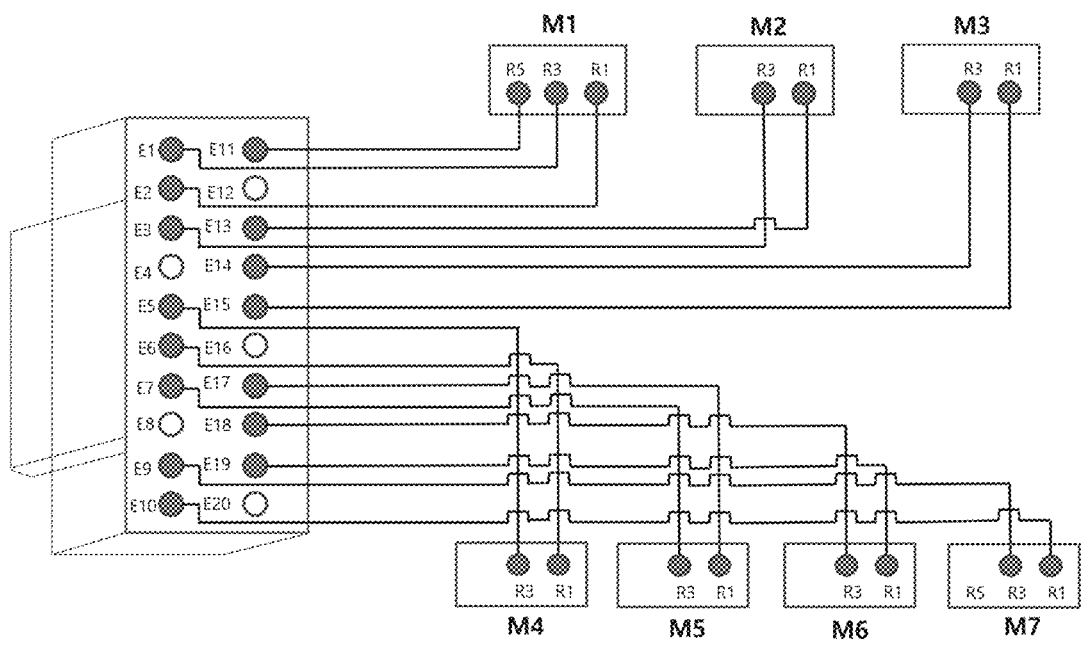
[Fig. 6]
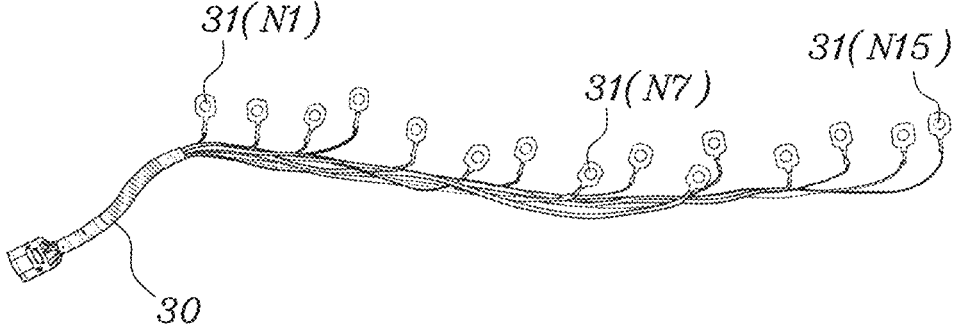

[Fig. 7]
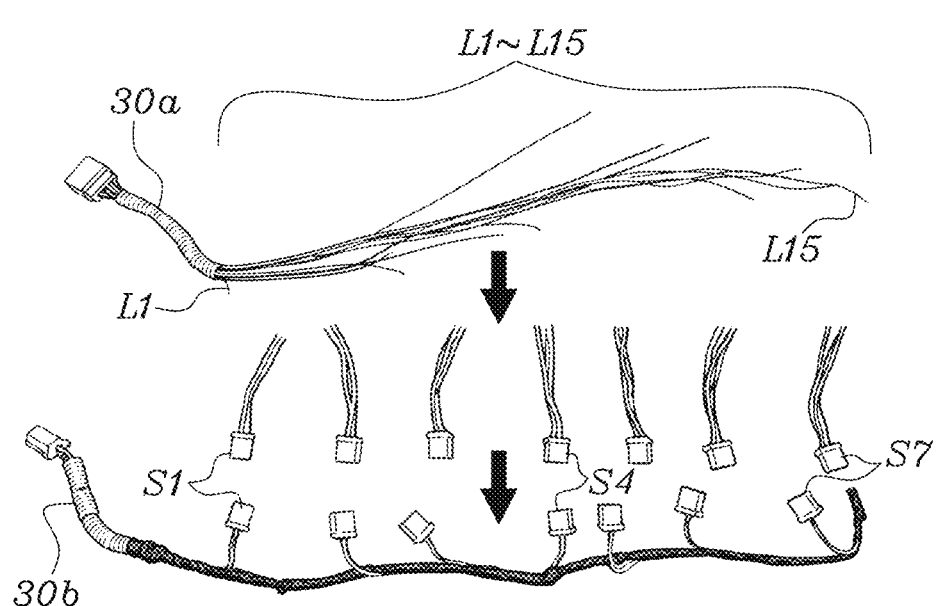

METHOD FOR REPLACING BATTERY PACK OF HYBRID ELECTRIC VEHICLE

TECHNICAL FIELD

The present invention relates to a method of replacing a battery pack for a hybrid electric vehicle, and more specifically, to a method of replacing a battery pack in which a nickel-metal hydride battery pack installed in the Prius manufactured by Toyota Motor Corporation in Japan is replaced with a lithium-ion battery pack manufactured and used in Korea to use the lithium-ion battery pack.

BACKGROUND ART

Recently, as rapid climate change caused by environmental pollution emerges as a common task of humanity, the demand for eco-friendly electric vehicles is significantly increasing. A hybrid electric vehicle (HEV), which is a type of such electric vehicles, uses an engine, that is, an internal combustion engine and a motor using a battery together as a power source, thereby significantly reducing the emission of an exhaust gas which is blamed for causing environmental pollution.

In general, a battery for an HEV is mounted in a vehicle in the form of a battery pack in which about 50 to 300 battery cells are connected in series according to a magnitude of an output voltage required by a vehicle. One battery pack generally has a nominal voltage of about 150 V to 600 V according to the output of a vehicle. In the battery pack, 2 to 20 battery cells are assembled to form one cell module, and the cell modules are connected to a battery electronic control unit (ECU) according to a unique battery management system (BMS).

In this regard, Korean Patent Registration No. 10-1260470 (Apr. 26, 2013), Korean Patent Registration No. 10-1449753 (Oct. 2, 2014), and the like disclose a connection device for electrically connecting a battery cell module of an electric vehicle to an ECU of the vehicle. In addition, Korean Patent Registration No. 10-2110977 (May 8, 2020) discloses a method of allowing a battery pack to be replaced immediately at the nearest charging station that has replaceable batteries when a battery of an electric vehicle needs to be replaced.

RELATED ART DOCUMENTS

Patent Documents

Korean Patent Registration No. 10-1260470 (Apr. 26, 2013)
Korean Patent Registration No. 10-1449753 (Oct. 2, 2014)
Korean Patent Registration No. 10-2110977 (May 8, 2020)

DISCLOSURE

Technical Problem

Conventionally, hybrid electric vehicles on the market mainly use nickel-metal hydride (Ni-MH) battery packs and lithium-ion (Li-ion) battery packs. For example, the Prius of Toyota Motor Corporation in Japan, which is the world's first hybrid electric vehicle, uses a nickel-metal hydride battery pack, and most hybrid electric vehicles currently developed and sold by Korean automakers use lithium-ion battery packs.

After a first release in 1997, about 3.9 million Prius vehicles have been globally sold by the end of 2020, and the Prius vehicles began to be imported in Korea in 2010, and about 30,000 or more Prius vehicles are calculated to have been sold until now. Therefore, among the Prius vehicles in operation in Korea, the number of vehicles, in which a vehicle operation period has elapsed beyond 10 years or a mileage exceeds about 100,000 km such that the time to replace a battery pack has been reached, is increasing exponentially every year.

However, nickel-metal hydride battery packs for the Prius vehicles are not currently being produced in Korea. In addition, since lithium-ion battery packs used in Korean electric vehicles and nickel-metal hydride battery packs installed in the Prius vehicles differ in a battery management system (BMS), such as a nominal voltage per cell module and a connection structure of terminals for a voltage sensor, it has been impossible so far to interchangeably use the lithium-ion battery pack and the nickel-metal hydride battery pack. Therefore, in order to replace battery packs of aging Prius vehicles, all of the nickel-metal hydride battery packs should be imported from Japan. Such a phenomenon is occurring not only in Korea but also in many countries around the world.

Accordingly, the present invention is directed to providing a method of replacing a battery pack in which a nickel-metal hydride battery pack mounted in a Prius vehicle is replaced with a lithium-ion battery pack used in a Korean electric vehicle, thereby using the lithium-ion battery pack.

Technical Solution

According to an embodiment of the present invention, According to an aspect of the present invention, there is provided a method of replacing a battery pack for an electric vehicle, in which a nickel-metal hydride battery pack, in which 28 cell modules each having a nominal voltage of 7.2 V are disposed in series and pack terminals (N1 to N15) for a voltage sensor are sequentially and alternately installed in the cell modules, is replaced with a lithium-ion battery pack in which a plurality of cell modules having a nominal voltage of 28.8 V are disposed in series and module terminals (R1 to R12) for a voltage sensor are installed in the cell modules.

The method includes operation A) of separating and removing the nickel-metal hydride battery pack from an electronic control unit (ECU) for a battery of the nickel-metal hydride electric vehicle and identifying 15 voltage sensor terminals connected to the pack terminals (N1 to N15) among voltage sensor terminals (E1 to E20) disposed in the ECU, operation B) of connecting seven cell modules constituting the lithium-ion battery pack in series and assembling a recombinant lithium-ion battery pack having the same nominal voltage of 201.6 V as the nickel-metal hydride battery pack, operation C) of sequentially identifying 15 module terminals having the same cumulative voltages as the pack terminals (N1 to N15) of the nickel-metal hydride battery among 84 module terminals [(R1 to R12)×(M1 to M7)] installed in cell modules (M1 to M7) of the recombinant lithium-ion battery pack and constructing a battery management system (BMS) corresponding to the nickel-metal hydride battery pack, operation D) of connecting the 15 module terminals of the recombinant lithium-ion battery pack identified in operation C) to the 15 voltage sensor terminals of the ECU identified in operation A) according to the BMS, and operation E) of installing a temperature sensor and an air sensor of the ECU to the recombinant lithium-ion battery pack and connecting a negative electrode output cable and a positive electrode output cable.

Advantageous Effects

According to the present invention, a nickel-metal hydride battery pack installed in a Prius vehicle manufactured by Toyota Motor Corporation in Japan is replaced with a lithium-ion battery pack used in a Korean hybrid electric vehicle to use the lithium-ion battery pack, thereby obtaining a significant import substitution effect and also obtaining an effect of efficiently recycling a large amount of waste batteries generated in a process of scrapping Korean hybrid electric vehicles.

DESCRIPTION OF DRAWINGS

FIG. 1 is an image captured in a state in which a nickel-metal hydride battery pack (10) is mounted in a Prius vehicle.

FIG. 2 is an image captured by photographing a socket terminal connected to an electronic control unit (ECU) (20) of the Prius vehicle.

FIG. 3 is a diagram illustrating a battery management system (BMS) of the Prius vehicle.

FIG. 4 is a diagram illustrating a layout of module terminals (R1 to R12) in a lithium-ion battery pack installed in a Korean hybrid electric vehicle.

FIG. 5 is a diagram illustrating a BMS of a recombinant lithium-ion battery pack.

FIG. 6 is an image captured by photographing a voltage sensor cable (30) separated from the Prius vehicle.

FIG. 7 is an image showing a process of manufacturing a hybrid cable (30b) using the voltage sensor cable (30) of FIG. 6.

MODES OF THE INVENTION

Hereinafter, the present invention will be described in detail with reference to the accompanying drawings. However, even in the case of components essentially required in the implementation of the present invention, detailed descriptions on details which could be readily implemented by a person skilled in the art from the related art will be omitted. Terms used to describe the technical configuration of the present invention are used with specifically defined meanings as follows.

First, the term "cell module" is a unit that constitutes the battery pack of a hybrid electric vehicle and refers to an assembly in which a plurality of battery cells are connected in series. The term "pack terminals" refers to a plurality of connection terminals installed in the battery pack in order to measure a voltage balance of the cell module, and the term "module terminals" refers to a plurality of connection terminals installed in the cell module in order to measure the voltage balance of the battery cell.

Next, the term "voltage sensor terminals" refers to a plurality of connection terminals installed in a battery electronic control unit (ECU) of the hybrid electric vehicle. The term "voltage sensor cable" refers to a wire bundle that allows the voltage sensor terminals and the pack terminals or module terminals to be connected in a 1:1 manner according to a unique battery management system (BMS). The term "separate terminals" refers to terminals independently installed at one end portions of electrical wires constituting the voltage sensor cable, and the term "socket terminal" refers to an integrated terminal configured to gather and connect electrical wires.

In addition, the term "hybrid cable" refers to a new type of assembly cable in which a socket terminal connected to a cell module of a lithium-ion battery pack is connected to a voltage sensor cable installed in a nickel-metal hydride battery pack. The term "recombinant lithium-ion battery pack" refers to a lithium-ion battery pack in which seven cell modules are connected in series according to the purpose of the present invention.

A method of replacing a battery pack for a hybrid electric vehicle according to the present invention includes A) separating a nickel-metal hydride battery pack from the hybrid electric vehicle, B) assembling a recombinant lithium-ion battery pack having the same nominal voltage as the nickel-metal hydride battery pack using a Korean lithium-ion battery pack, C) constructing a BMS for the recombinant lithium-ion battery pack, which corresponds to the nickel-metal hydride battery pack, D) installing the recombinant lithium-ion battery pack in the hybrid electric vehicle according to the BMS, and performing a finishing operation E). However, operations A) to E) are not necessarily performed in time series, and a sequence of some operations may be changed as necessary.

First, in operation A), a nickel-metal hydride battery pack 10, an ECU 20, a voltage sensor cable 30, output cables 40 and 50, temperature sensors 60, an air sensor, and the like are separated from the hybrid electric vehicle equipped with a nickel-metal hydride battery pack, and the nickel-metal hydride battery pack 10 is removed. The hybrid electric vehicle may be a Prius vehicle manufactured by Toyota Motor Corporation in Japan.

The nickel-metal hydride battery pack 10 mounted in the Prius vehicle has a structure in which 28 cell modules having a nominal voltage of 7.2 V are connected in series as shown in FIG. 1. The cell module includes six 1.2 V battery cells, and two cell modules are connected in series again to constitute one cell block. Accordingly, the nickel-metal hydride battery pack includes 14 cell blocks, each of which has a nominal voltage of 14.4 V, connected in series, and thus, the nickel-metal hydride battery pack has a total nominal voltage of 201.6 V.

A total of 15 pack terminals for a voltage sensor including one ground (GND) terminal are installed in the nickel-metal hydride battery pack 10. In the present invention, the pack terminals are referred to as N1 to N15 in order from the GND terminal. Except for a first pack terminal N1 which is the GND terminal, each of the remaining pack terminals N2 to N15 is connected to one of the 14 cell blocks. Thus, a voltage balance between the GND terminal N1 and each cell block is measured.

As shown in FIG. 1, the ECU 20 is installed on one side of the nickel-metal hydride battery pack 10, and the voltage sensor cable 30 is installed between the battery pack 10 and the ECU 20. A negative electrode output cable 40 and a positive electrode output cable 50 are connected to the first pack terminal N1 and a last pack terminal N15 of the battery pack 10, respectively. Three temperature sensors 60 are attached to an upper surface of the battery pack 10, and the air sensor (not shown in FIG. 1) is installed on one side thereof. The temperature sensors 60 and the air sensor are each connected to the ECU 20 to check a temperature of the battery pack 10 and an operating state of a cooling fan.

Meanwhile, FIG. 2 is an image captured by photographing a socket terminal connected to the ECU 20 from the voltage sensor cable 30. A total of 20 separate terminals are disposed horizontally in two rows in the socket terminal, and unique numbers are assigned in order from right to left. This means that 20 voltage sensor terminals corresponding to the socket terminal are also installed in the ECU 20 for a battery. Therefore, when the voltage sensor cable 30 is separated from the ECU 20, 20 voltage sensor terminals installed in the ECU 20 are secured. In the present invention, the voltage sensor terminals are referred to as E1 to E20 according to the order of the separate terminals disposed in the socket terminal.

Since the ECU 20 is also commonly used for other vehicle models manufactured by Toyota Motor Corporation, the usage details of the voltage sensor terminals E1 to E20 are different according to the vehicle models. In the case of the Prius vehicle, among the voltage sensor terminals E1 to E20, five terminals E4, E8, E12, E16, and E20 are not used, and only the remaining 15 terminals are used. Therefore, each of the 15 terminals is independently connected to one of the pack terminals N1 to N15 of the battery pack through the voltage sensor cable 30. FIG. 3 is a diagram illustrating a connection state between the pack terminals N1 to N15 and the voltage sensor terminals E1 to E20, that is, a BMS, in the Prius vehicle.

Next, in operation B), seven cell modules constituting the lithium-ion battery pack are connected in series to assemble the lithium-ion battery pack of which a total nominal voltage is the same as the nominal voltage of 201.6 V of the nickel-metal hydride battery pack. Cell modules constituting a lithium-ion battery pack recovered from a Korean hybrid electric vehicle may be used as the cell modules.

A lithium-ion battery pack including cell modules having a nominal voltage of 28.8 V is mounted in hybrid electric vehicles manufactured by Hyundai Motor Company or KIA Motors Company, which is a Korean automaker, and the cell module includes eight 3.6 V battery cells connected in series. Therefore, when the seven cell modules are connected in series, it is possible to assemble a recombinant lithium-ion battery pack having a total nominal voltage of 201.6 V (28.8 V×7). The seven cell modules constituting the recombinant lithium-ion battery pack are sequentially referred to as M1 to M7.

For reference, Korean hybrid electric vehicles are equipped with a lithium-ion battery pack in which six or nine cell modules are connected in series according to vehicle models. Thus, when a lithium-ion battery pack recovered from a scrapped vehicle includes six cell modules, one cell module is added, and when the lithium-ion battery pack includes nine cell modules, two cell modules are removed. Therefore, it is possible to assemble a recombinant lithium-ion battery pack having the same nominal voltage as the nickel-metal hydride battery pack of the Prius vehicle.

Next, in operation C), the BMS corresponding to the nickel-metal hydride battery pack is constructed for the recombinant lithium-ion battery pack. 12 module terminals for a voltage sensor each connected to the ECU are installed in each of the cell modules M1 to M7 constituting the recombinant lithium-ion battery pack. FIG. 4 is a diagram illustrating a layout of the module terminals. In the present invention, 12 module terminals are sequentially referred to as R1 to R12.

According to the BMS of the lithium-ion battery pack, among the module terminals R1 to R12, R5 is a GND terminal, and R6, R11, and R12 are unused terminals. The remaining R10, R4, R9, R3, R8, R2, R7, and R1 are sequentially connected to eight battery cells constituting the cell module. Thus, a voltage balance between the GND terminal R5 and each battery cell is measured. In this case, since the battery cells are connected in series, a voltage is gradually accumulated in the order of the module terminals connected to the battery cells. Table 1 below shows cumulative voltages applied to the module terminals R1 to R12.

TABLE 1

| Module terminal | R1 | R2 | R3 | R4 | G5 | R6 |
|---|---|---|---|---|---|---|
| Cumulative voltage | 28.8 | 21.6 | 14.4 | 7.2 | GND | Blank |
| Module terminal | R7 | R8 | R9 | R10 | R11 | R12 |
| Cumulative voltage | 25.2 | 18.0 | 10.8 | 3.6 | Blank | Blank |

As shown in Table 1 above, a cumulative voltage of 14.4 V of the module terminal R3 is the same as a nominal voltage of 14.4 V of one cell block constituting the nickel-metal hydride battery pack of the Prius vehicle, and a cumulative voltage of 28.8 V of the module terminal R1 is the same as a nominal voltage of 28.8 V of two cell blocks.

Therefore, when the module terminals R3 and R1 are selected from each of the cell modules M1 to M7 constituting the recombinant lithium-ion battery pack, it is possible to construct a BMS having the same cumulative voltages applied to the pack terminals N2 to N15 constituting the nickel-metal hydride battery pack of the Prius vehicle. The BMS of the recombinant lithium-ion battery pack constructed in such a manner is shown in Table 2 below and FIG. 5.

TABLE 2

| Voltage sensor terminal | E1 | E2 | E3 | E5 | E6 |
|---|---|---|---|---|---|
| Cell module-module | M1-R3 | M1-R1 | M2-R3 | M4-R3 | M4-R1 |
| Voltage sensor terminal | E7 | E9 | E10 | E11 | E13 |
| Cell module-module | M5-R3 | M7-R3 | M7-R1 | M1-R5 | M2-R1 |
| Voltage sensor terminal | E14 | E15 | E17 | E18 | E19 |
| Cell module-module | M3-R3 | M3-R1 | M5-R1 | M6-R3 | M6-R1 |

A GND terminal of the recombinant lithium-ion battery pack is a module terminal R5 of a first cell module M1 (denoted by M1-R5), and the module terminal M1-R5 corresponds to the pack terminal N1 which is the GND terminal of the nickel-metal hydride battery pack. As shown in FIG. 2, the pack terminal N1 is connected to a voltage sensor terminal E11. Therefore, the module terminal M1-R5 is also connected to the voltage sensor terminal E11.

The last module terminal M7-R1 of the recombinant lithium-ion battery pack corresponds to the pack terminal N15 which is the last terminal of the nickel-metal hydride battery pack. The pack terminal N15 is connected to a voltage sensor terminal E10. Therefore, the module terminal M7-R1 is also connected to the voltage sensor terminal E10. In addition, voltage sensor terminals E4, E8, E12, E16, and E20 all remain empty even in the BMS of the recombinant lithium-ion battery pack. Accordingly, the BMS of Table 2 and FIG. 5 is substantially the same as the BMS of the nickel-metal hydride battery pack (see FIG. 3).

Next, in operation D), the recombinant lithium-ion battery pack is installed in the hybrid electric vehicle, and 15 module terminals of the recombinant lithium-ion battery pack are connected to 15 voltage sensor terminals of the ECU 20 according to the BMS of Table 2 and FIG. 5.

According to exemplary embodiments of the present invention, a method of connecting the module terminals to the voltage sensor terminals may be performed according to the following operations D1) to D5).

First, in operation D1), the voltage sensor cable 30 installed between the ECU 20 for a battery of the Prius vehicle and the nickel-metal hydride battery pack 10 is collected. FIG. 6 is an image captured by photographing the voltage sensor cable 30, and 15 separate terminals 31 connected to the pack terminals N1 to N15 of the nickel-metal hydride battery pack are disposed at one side thereof. When all of the 15 separate terminals 31 are removed from the voltage sensor cable 30, as shown in FIG. 7, a voltage sensor cable 30a with only cable wires L1 to L15 remaining is secured.

Next, operation D2), a voltage sensor cable (not shown in the drawing) used for the recombinant lithium-ion battery pack is separated, and socket terminals S1 to S7 connected to the cell modules M1 to M7 are cut and recovered from the voltage sensor cable. FIG. 7 shows appearances of the socket terminals S1 to S7. 12 electrical wires connected to the module terminals R1 to R12 are connected to each of the socket terminals S1 to S7.

Then, in operation D3), in the socket terminal S1 among the socket terminals S1 to S7, except for only three electrical wires connected to the module terminals R1 and R3 and R5, the remaining electrical wires are all cut and removed. In each of the socket terminals S2 to S7, except for only two electrical wires connected to the module terminals R1 and R3, the remaining electrical wires are all cut and removed. In this way, in the socket terminals S1 to S7, one electrical wire connected to the module terminal R5, seven electrical wires connected to the module terminal R1, and seven electrical wires connected to the module terminal R3, i.e., a total of 15 socket terminal wires, are secured.

Next, in operation D4), the 15 socket terminal wires are connected to the cable wires L1 to L15 of the voltage sensor cable 30a according to the BMS of Table 2, thereby manufacturing a hybrid cable 30b. FIG. 7 shows a process of manufacturing the hybrid cable 30b, and the cable wires L1 to L15 and the socket terminal wires may be connected to each other as shown in Table 3 below. In Table 3 below, R1, R3, and R5 refer to the module terminals to which the socket terminal wires are connected.

TABLE 3

| Cable wire | L1 | L2 | L3 | L4 | L5 |
|---|---|---|---|---|---|
| Socket terminal wire | S1-R3 | S1-R1 | S2-R3 | S4-R3 | S4-R1 |
| Cable wire | L6 | L7 | L8 | L9 | L10 |
| Socket terminal wire | S5-R3 | S7-R3 | S7-R1 | S1-R5 | S2-R1 |
| Cable wire | L11 | L12 | L13 | L14 | L15 |
| Socket terminal wire | S3-R3 | S3-R1 | S5-R1 | S6-R3 | S6-R1 |

Thereafter, in operation D5), the socket terminals S1 to S7 of the hybrid cable 30b are respectively connected to the cell modules M1 to M7 of the recombinant lithium-ion battery pack. In the hybrid cable 30b, opposite end portions of the socket terminals S1 to S7 are connected to the ECU 20. In this way, 15 voltage sensor terminals of the ECU 20 and 15 module terminals of the recombinant lithium-ion battery pack are sequentially connected according to the BMS.

In finishing operation E), the temperature sensors 60 separated in operation A) are attached to the recombinant lithium-ion battery pack, and the air sensor is installed. The negative electrode output cable 40 and the positive electrode output cable 50 are connected to the cell modules M1 and M7 of the recombinant lithium-ion battery pack. If necessary, a non-flammable insulating material is attached to both side surfaces and a bottom of the recombinant lithium-ion battery pack.

For reference, the negative electrode output cable 40 and the positive electrode output cable 50 installed in the Prius vehicle are used without any change. In this case, when the recombinant lithium-ion battery pack is installed upright, the lengths of the output cables 40 and 50 do not match each other. Therefore, when the recombinant lithium-ion battery pack is installed upside down, lengths do not need to be adjusted, and the output cables 40 and 50 may be used without any change.

| [Descriptions of Reference Numerals] | |
|---|---|
| 10: battery pack | 20: ECU |
| 30, 30a: voltage sensor cable | 30b: hybrid cable |
| 31: separate terminal | 40: negative electrode output cable |
| 50: positive electrode output cable | 60: temperature sensor |
| E1 to E20: voltage sensor terminals | N1 to N15: pack terminals |
| M1 to M7: cell modules | R1 to R12: module terminals |
| S1 to S7: socket terminals | L1 to L15: cable wires |

What is claimed is:

1. A method of replacing a battery pack for an electric vehicle, in which a nickel-metal hydride battery pack, in which 28 cell modules each having a nominal voltage of 7.2 V are disposed in series and pack terminals (N1 to N15) for a voltage sensor are sequentially and alternately installed in the cell modules, is replaced with a lithium-ion battery pack in which a plurality of cell modules having a nominal voltage of 28.8 V are disposed in series and module terminals (R1 to R12) for a voltage sensor are installed in the cell modules, the method comprising:

operation A) of separating and removing the nickel-metal hydride battery pack from an electronic control unit (ECU) for a battery of the nickel-metal hybrid electric vehicle and identifying 15 voltage sensor terminals connected to the pack terminals (N1 to N15) among voltage sensor terminals (E1 to E20) disposed in the ECU;

operation B) of connecting seven cell modules constituting the lithium-ion battery pack in series and assembling a recombinant lithium-ion battery pack having the same nominal voltage of 201.6 V as the nickel-metal hydride battery pack;

operation C) of sequentially identifying 15 module terminals having the same cumulative voltages as the pack terminals (N1 to N15) of the nickel-metal hydride battery among 84 module terminals [(R1 to R12)×(M1 to M7)] installed in cell modules (M1 to M7) of the recombinant lithium-ion battery pack and constructing a battery management system (BMS) corresponding to the nickel-metal hydride battery pack;

operation D) of connecting the 15 module terminals of the recombinant lithium-ion battery pack identified in operation C) to the 15 voltage sensor terminals of the ECU identified in operation A) according to the BMS; and operation E) of installing a temperature sensor and an air sensor of the ECU to the recombinant lithium-ion battery pack and connecting a negative electrode output cable and a positive electrode output cable.

2. The method of claim 1, wherein, in operation C), the BMS is constructed as below:

voltage sensor terminals E1 and E2 are connected to module terminals R3 and R1 of the first cell module (M1), respectively, voltage sensor terminals E3 and E13 are connected to module terminals R3 and R1 of the second cell module (M2), respectively, voltage sensor terminals E14 and E15 are connected to module terminals R3 and R1 of the third cell module (M3), respectively, voltage sensor terminals E5 and E6 are connected to module terminals R3 and R1 of the fourth cell module (M4), respectively, voltage sensor terminals E7 and E17 are connected to module terminals R3 and R1 of the fifth cell module (M5), respectively, voltage sensor terminals E18 and E19 are connected to module terminals R3 and R1 of the sixth cell module (M6), respectively, voltage sensor terminals E9 and E10 are connected to module terminals R3 and R1 of the seventh cell module (M7), respectively, and a GND-related voltage sensor terminal E11 is connected to the module terminal R5 of the first cell module (M1).

3. The method of claim 1, wherein, in operation D), the connecting of the 15 module terminals of the recombinant lithium-ion battery pack to the 15 voltage sensor terminals of the ECU includes:

operation D1) of cutting 15 separate terminals connected to the pack terminals (N1 to N15) for a voltage sensor from a voltage sensor cable used for the nickel-metal hydride battery pack and securing cable wires (L1 to L15);

operation D2) of cutting and recovering socket terminals (S1 to S7) respectively connected to the cell modules (M1 to M7) from a voltage sensor cable used for the recombinant lithium-ion battery pack;

operation D3) of, among the socket terminals (S1 to S7), leaving only electrical wires of the socket terminal (S1) connected to the module terminals (R1, R2, and R5)

and removing all of the remaining electrical wires thereof and leaving electrical wires of each of the socket terminals (S2 to S7) connected to the module terminals (R1 and R3) and removing all of the remaining electrical wires thereof;

operation D4) of manufacturing a hybrid cable by connecting 15 socket terminal wires remaining in the socket terminals (S1 to S7) to the cable wires (L1 to L15) so as to correspond to the BMS; and operation D5) of connecting the socket terminals (S1 to S7) of the hybrid cable to the cell modules (M1 to M7) of the recombinant lithium-ion battery pack, respectively.

4. The method of claim, 3, wherein the hybrid cable is manufactured by connecting the cable wires (L1 to L15) and the 15 socket terminal wires remaining in the socket terminals (S1 to S7) as follows:

L1 and L2 are connected to the wires of socket S1 corresponding to module terminals R3 and R1, respectively, L3 and L10 are connected to the wires of socket S2 corresponding to module terminals R3 and R1, respectively, L11 and L12 are connected to the wires of socket S3 corresponding to module terminals R3 and R1, respectively, L4 and L5 are connected to the wires of socket S4 corresponding to module terminals R3 and R1, respectively, L6 and L13 are connected to the wires of socket S5 corresponding to module terminals R3 and R1, respectively, L14 and L15 are connected to the wires of socket S6 corresponding to module terminals R3 and R1, respectively, L7 and L8 are connected to the wires of socket S7 corresponding to module terminals R3 and R1, respectively, and L9 is connected to the wire of socket S1 corresponding to the module terminal R5.

* * * * *